US012320166B2

(12) United States Patent
Breaux

(10) Patent No.: US 12,320,166 B2
(45) Date of Patent: Jun. 3, 2025

(54) TRAVEL CUFF

(71) Applicant: Michael C Breaux, Wake Forest, NC (US)

(72) Inventor: Michael C Breaux, Wake Forest, NC (US)

( * ) Notice: Subject to any disclaimer, the term of this patent is extended or adjusted under 35 U.S.C. 154(b) by 106 days.

(21) Appl. No.: 18/479,197

(22) Filed: Oct. 2, 2023

(65) Prior Publication Data

US 2025/0109612 A1 Apr. 3, 2025

(51) Int. Cl.
*E05B 75/00* (2006.01)

(52) U.S. Cl.
CPC .................................... *E05B 75/00* (2013.01)

(58) Field of Classification Search
CPC ............................... E05B 75/00; E05B 75/005
USPC .............................................................. 70/16
See application file for complete search history.

(56) References Cited

U.S. PATENT DOCUMENTS 4,071,023 A * 1/1978 Gregory .................. E05B 75/00 128/882
4,173,974 A * 11/1979 Belliveau ................ E05B 75/00 128/882
4,351,169 A * 9/1982 Plymale .................. E05B 75/00 70/16
2014/0318553 A1* 10/2014 Wolfe ..................... E05B 75/00 128/878
2016/0215528 A1* 7/2016 Pedric ..................... E05B 75/00
2020/0318396 A1* 10/2020 Herman .................. E05B 75/00

* cited by examiner

*Primary Examiner* — Nathan Cumar
(74) *Attorney, Agent, or Firm* — James G Passe; Passe Intellectual Property

(57) ABSTRACT

A wrist cuff is designed to hold a user's arms together when seated on a transportation vehicle, like an airplane; the arms are slipped into each cuff and the cuffs are held together.

6 Claims, 2 Drawing Sheets

TRAVEL CUFF

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device for restraining a user's arms when seated next to someone on a transportation device, such as an airplane.

Description of Related Art

The ability to rest is difficult while seated in seats where everyone is seated almost touching, such as in the 3 across seats on airlines. Since, in most cases, armrests must be shared, e.g. 4 arm rests for three people on a 3 across airline seats, touch of people's arms and such are inevitable. It can be even more imposing if a large individual is seated next to you.

This problem is escalated when you are falling asleep in this position. When you fall asleep, your arms naturally separate causing the sleep to be short lived when the arms start rubbing against the neighbor seated next to you. In addition, hard plastic armrests create pain in the arms after a period of time, especially on long trips or flights. Folding the arms is a short term solution, but not for long periods of time like an entire airline flight. After a period of time, the arms must be relaxed. Currently, there are no clear remedies for the multiple problems in this situation.

BRIEF SUMMARY OF THE INVENTION

The present invention relates to a solution for the above identified problems. The invention relates to an arm/wrist cuff which restrains both arms if a position in front of the user. It is made of a material that is comfortable over long periods of time (e.g. an average airline flight). This prevents the arms from opening up and touching people sitting next to you.

Accordingly, in one embodiment, there is a wrist cuff designed to prevent the arms of a user from separating while sleeping in a seated position comprising: a pair of rings, each ring designed to be placed on the wrists of the user wherein the rings are connected by a connector and wherein the rings and connector are flexible.

In another embodiment, there is a method of preventing the arms of a user from separating while sleeping in a seated position comprising:

a) prior to sleeping, selecting a wrist cuff design comprising 2 rings connected by a connector wherein the rings and connector are flexible;

b) inserting one wrist into each ring;

c) positioning the rings and wrists directly in front of the seated user; and d) the user going to sleep.

DETAILED DESCRIPTION OF THE INVENTION

Figure 1:
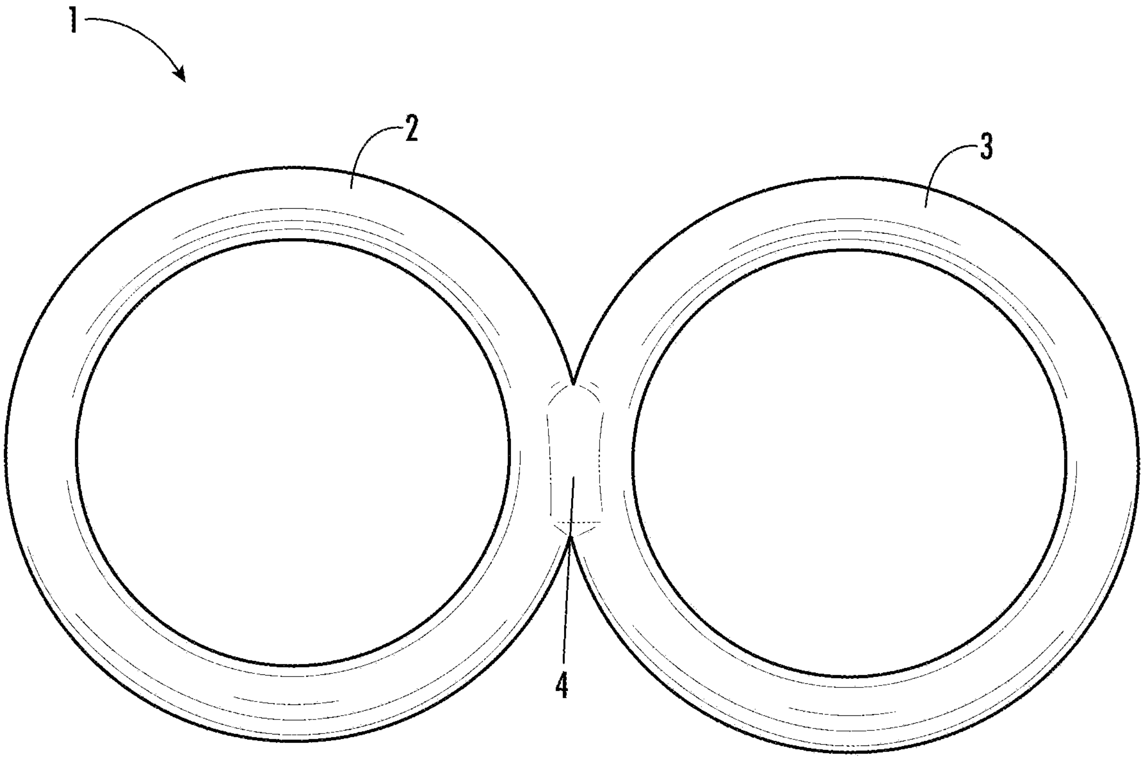
FIG. 1 is a view of the wrist cuff of the invention

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publication may set out definitions of a term that conflict with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "wrist cuff" refers to a type of device for restricting the hands, but is easy for the user to insert and remove the wrists from the device when using. This is as opposed to hand cuffs which are designed to prevent a user from removing their hands and usually requires a key to open each side of the handcuffs. A wrist cuff has two rings which each slips around a wrists of the user and is held together by a connector. The wrists can just as easily be removed from the wrist cuff. The wrist cuff is designed to be comfortable and non-abrasive while wearing so the wrist cuff is made of a polymer, a rubber, silicon, or the like. These types of materials are flexible allowing twisting of the wrists and easy insertion and removal of the wrists. Examples of flexible materials include elastomeric materials.

As used herein, the term "prevent the arms of a user from separating" refers to the fact that a seated sleepers arms separate when they fall asleep. The wrist cuff holds the wrists together preventing the arms from separating. In one embodiment, the cuffed wrists are placed in about the center of the user's lap. In another embodiment, the rings are tube-like.

As used herein, the term "a pair of rings" refers to one ring for each of the user's wrist. They are made of a flexible material such as a polymer, rubber or silicon material that is both comfortable to hold the wrists for an extended time and allows easy entry and removal of the cuff because of the flexibility. The circumference of the rings is small enough to hold the wrists in place and flexible enough to allow the user to easily put the cuffs on and off. In general, the outer circumference of the rings is in the about 10 inches to about 12 inches though depending on the user might be smaller (e.g. for a child) or larger.

As used herein, the term "connector" refers to a piece of material that is the same as for the rings, which holds the rings together. The connector in one embodiment is from about 4 to about 1 inch.

As used herein, the term "flexible" refers to the material being able to deform enough to get the wrists in and out of the rings. One of skill in the art could determine the exact composition in view of the disclosures herein.

DRAWINGS

Now referring to the drawings, FIG. 1 is a frontal view of the wrist cuffs of the present invention. Wrist cuffs 1 comprise a first ring 2 and a second ring 3 connected by a connector 4 where the entire device is made of the same material as described above.

Figure 2:
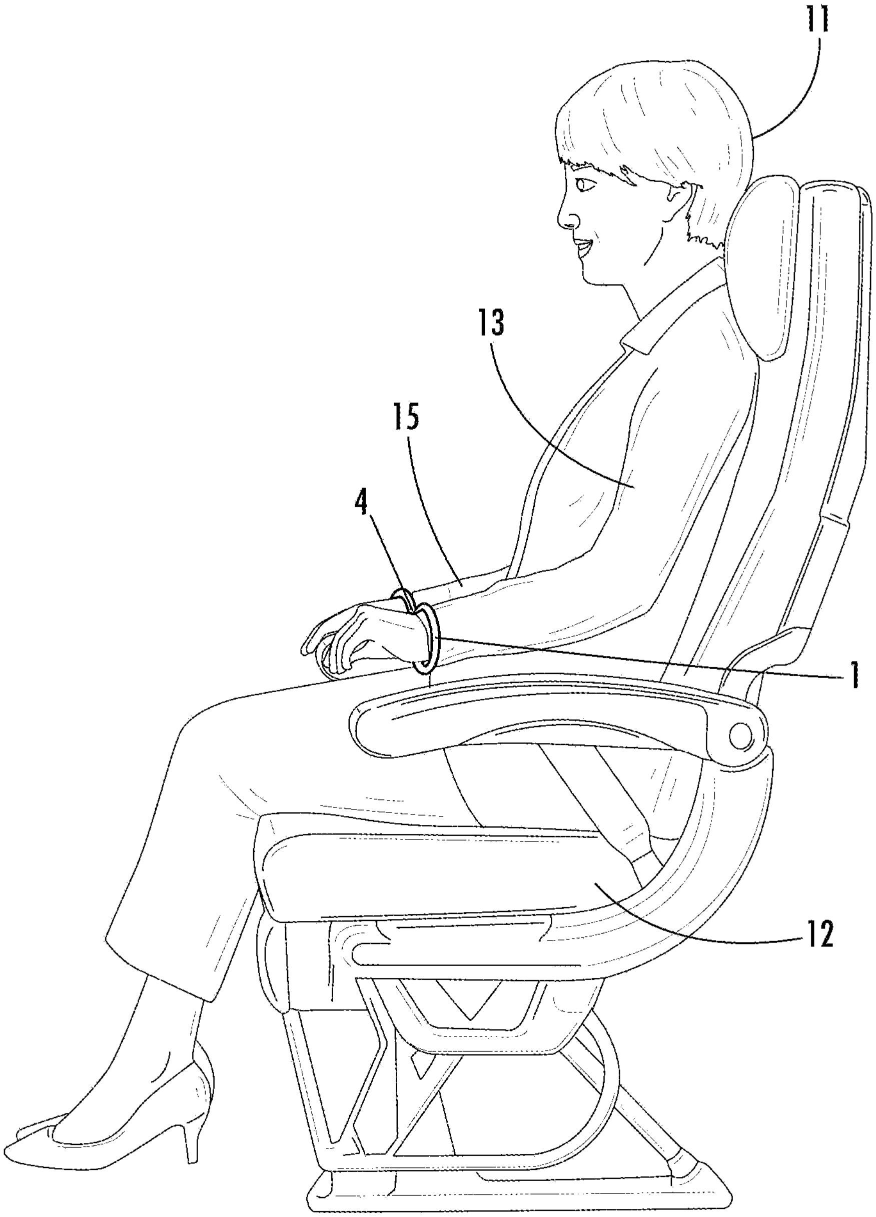
FIG. 2 is a user seated with the wrist cuff around the user's wrists and placed in front of the user.

FIG. 2 shows the method of use of the present device. In this view user 11 is seated on airline seat 12. The users' arms 13 are positioned in the users lap and the wrist cuff 1 is shown around each wrist 14. This holds the user's arms together and prevents them from separating while user 11 falls asleep.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A wrist cuff designed to prevent the arms of a user from separating while sleeping in a seated position comprising:
- a pair of rings, each ring designed to be placed on the wrists of the user wherein the rings are connected by a connector and wherein the rings and connector are flexible so that the user may easily take the wrist cuff on and off.

2. The wrist cuff according to claim 1 wherein the rings and connector are made of a flexible rubber or silicone material.

3. The wrist cuff according to claim 1 wherein the user is seated on an airplane.

4. A method of preventing the arms of a user to separate while sleeping in a seated position comprising:
- a) prior to sleeping, selecting a wrist cuff design comprising a pair of rings connected by a connector wherein the rings and connector are flexible so that the user may easily take the wrist cuff on and off;
- b) inserting one wrist into each ring;
- c) positioning the rings and wrists directly in front of the seated user; and
- d) the user going to sleep.

5. The method of preventing the arms of a user to separate while seated according to claim 4, wherein the rings and connector are made of a flexible rubber or silicone material.

6. The method of preventing the arms of a user to separate while seated according to claim 4, wherein the user is seated on an airplane.

* * * * *